H. G. CARLSON.
METHOD OF MAKING BOOSTER CASINGS AND ADAPTERS FOR GAS SHELLS OR THE LIKE.
APPLICATION FILED APR. 22, 1918.
1,312,517.
Patented Aug. 12, 1919.
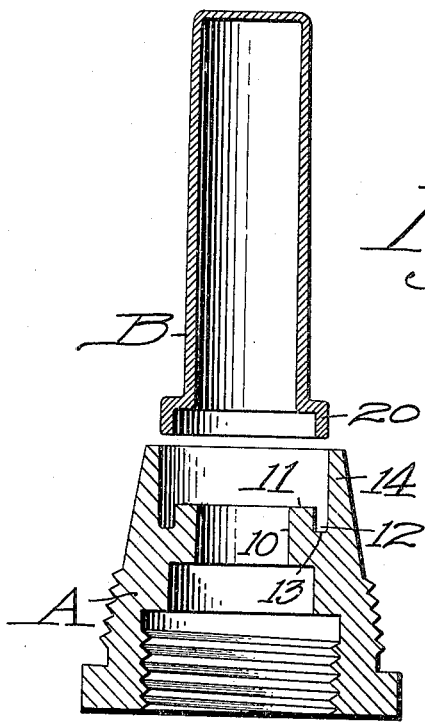
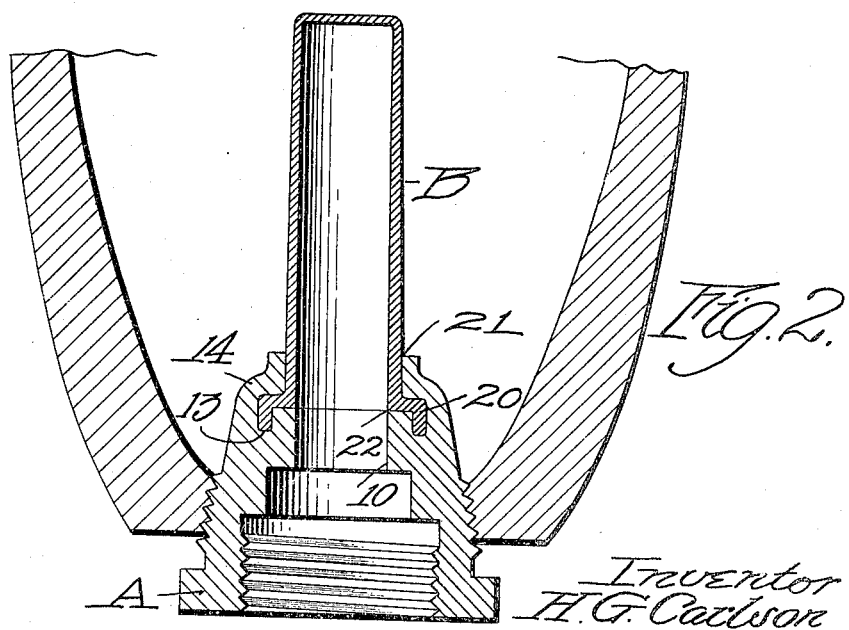

UNITED STATES PATENT OFFICE.

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

METHOD OF MAKING BOOSTER-CASINGS AND ADAPTERS FOR GAS-SHELLS OR THE LIKE.

1,312,517.   Specification of Letters Patent.   Patented Aug. 12, 1919.

Original application filed November 17, 1917, Serial No. 202,671. Divided and this application filed April 22, 1918. Serial No. 229,971.

*To all whom it may concern:*

Be it known that I, HJALMAR G. CARLSON, a citizen of the United States, residing at Worcester, in the county of Worcester and State of Massachusetts, have invented a new and useful Method of Making Booster-Casings and Adapters for Gas-Shells or the like, of which the following is a specification.

This invention relates to a method of finishing a combined base and hollow casing and is especially adapted for the so-called gaine for gas and other shells which consists of a booster casing and adapter. These two parts have been made in one and turned up from solid or bar stock or screw threaded to connect them. The former provides an integral structure, but makes the article very expensive because of the time required to turn it up to the various dimensions necessary and especially because of the defects due to piping and the difficulty of turning out the inside with sufficient accuracy at the closed end where the stock has to be thin. There is also a very material loss of metal.

The principal object of this invention is to materially reduce the expense and time required for making such articles. This is done according to the present invention by making the gaine in two parts and permanently uniting them. The adapter is formed in a general way as they are formed now, but means is provided for permanently and effectively uniting it with the booster casing and hermetically sealing the two together. The booster casing is formed of drawn sheet metal in such a way as to be manufactured and joined to the adapter at an extremely small expense. In this way the time required for turning out the most difficult part of the device is almost entirely eliminated so that the production per unit of plant and labor is very materially increased. The metal usually wasted in making that part of the device is almost entirely saved, and some part of the metal usually wasted in connection with the adapter is also saved. The two parts are permanently united without cutting any screw threads. These results are accomplished without reducing the perfection of the product or introducing any weak joints or the like.

Reference is to had to the accompanying drawings, in which—

Figure 1 is a central sectional view of an adapter and booster casing ready to be set together in order to be connected permanently according to this invention, and Fig. 2 is a similar view showing them permanently connected and mounted in the gas shell.

In accordance with this invention the adapter A is turned up in the usual way from bar stock and provided with the same shape and dimensions at the open end as has been the case heretofore, and the same screw-threads on the interior and also on all of the exterior that comes outside the shell and contacts with it. These parts are old of course and need not be described in detail. The particular form of them shown herein is the one now in use and will be varied in accordance with requirements. But the part that projects inside the gas shell is constructed in a novel way.

It will be observed that the central passage 10 which extends through the adapter and terminates at what I call the end of the adapter, namely, at the flat surface 11 is surrounded beyond this flat surface by a groove 12. This groove extends longitudinally into the adapter and is circular in form preferably and concentric with the passage 10. Its bottom provides a flat seat 13 and its outer surface is formed by the inner surface of a flange 14 which projects beyond the end of the adapter and also is circular and concentric with it. Fig. 1 shows the final form in which the adapter is made before assemblage.

The booster casing B is formed of sheet metal drawn to shape in dies, the particular method of drawing not being a part of this invention, and not being described herein, but however it is drawn, it is provided with thin walls as is necessary in this art and it is also provided with a flange 20 beyond its open end. This flange 20 is made of a length slightly greater than the depth of the groove 12 and has a thickness substantially equal to the width of said groove, giving just enough clearance so that it can be forced into the position shown in Fig. 2 without the employment of mechanical power. Then the end proper of the booster casing is slightly spaced from the surface 11 which constitutes the end of the adapter and the flange 20 projects to the bottom of the groove 12.

Now the outer edge of the flange 14 is pressed inwardly firmly against the surface of the booster casing B with such force as to cause the metal to flow inwardly all around the shoulder formed by the projecting flange 20 and to contact with the booster casing with an absolutely tight fit at its outer edge, that is, at the point 21. This permanently and unmovably unites the two parts. Inasmuch as pressure is applied from the tip in Fig. 2 angularly downward toward the surface 11, the end of the booster casing is also pressed firmly against this surface 11. I have found in practice that the pressure can be applied so effectively in completing the union between these two members that both this and the joints at 21 and 22 are hermetically sealed by this pressure. However, for the purpose of further insuring this necessary result I prefer to seal one or both of these joints additionally either by a welding or soldering process. It is to be seen that by projecting the flange 20 outwardly from the edge of the casing B an important leverage is secured to resist any bending tendency to which the device might be put before it is introduced into the shell.

In this way a gaine is secured formed of two parts each made in the way best suited to its construction, that is, to the best advantage yet the two parts are permanently united and the article is just as certain as if it were made in a single piece. This greatly facilitates production.

Although I have illustrated and described only a single way of carrying out the invention and shown it as applied in only one way, I am aware of the fact that modifications can be made therein and that it can be applied to other articles than gaines by any person skilled in the art without departing from the spirit of the invention as expressed in the claims. Therefore I do not wish to be limited to all the details of procedure herein shown and described, but what I do claim is:—

1. The method of making a combined adapter and booster casing which consists in providing the adapter on its inner end with a seat surrounding the central passage thereof, and an external flange extending beyond the seat, placing against the end of the adapter a booster casing so that its end fits in said seat, and pressing the flange inwardly against the surface of the booster casing.

2. The method of making a combined adapter and booster casing which consists in making one member from a piece of bar stock, turning it up, screw-threading, and providing it on its inner end with a seat surrounding the central passage thereof, and an external flange extending beyond the seat, forming the booster casing from a pressed sheet steel blank by drawing operations, providing it with a flange at its open end spaced outwardly from the central opening therein and concentric with the main body of the casing, inserting said flange in said seat until the end of the casing rests against the end of the adapter, and then pressing the first named flange inwardly and firmly against the surface of the adapter at the end of the flange and also against the shoulder formed back of the flange on the casing.

3. The method of making a combined adapter and booster casing which consists in providing an adapter on its inner end with a seat and an external flange, forming the booster casing from a pressed sheet steel blank by drawing operations, providing it with a flange at its open end spaced outwardly from the central opening therein and concentric with the main body of the casing, inserting said flange in said seat until the end of the casing rests against the end of the adapter, and then pressing the first named flange inwardly and firmly against the surface of the adapter at the end of the flange and also against the shoulder formed back of the flange on the casing so as to form a hermetrically sealed joint between the two at the end of the adapter flange and another joint between the ends of the casing and adapter and then further sealing one of said joints.

In testimony whereof I have hereunto affixed my signature.

HJALMAR G. CARLSON.

Copies of this patent may be obtained for five cents each, by addressing the "Commissioner of Patents, Washington, D. C."